United States Patent [19]

Sakurai et al.

[11] 4,159,965
[45] Jul. 3, 1979

[54] CATALYST USEFUL FOR POLYMERIZING OLEFINS

[75] Inventors: Hisaya Sakurai; Hideo Morita; Tadashi Ikegami; Shigeo Tsuyama, all of Kurashiki, Japan

[73] Assignee: Asahi Kasei Kogyo Kabushiki Kaisha, Osaka, Japan

[21] Appl. No.: 836,343

[22] Filed: Sep. 26, 1977

[30] Foreign Application Priority Data

Sep. 28, 1976 [JP] Japan .................. 51-115400
Dec. 6, 1976 [JP] Japan .................. 51-145695

[51] Int. Cl.$^2$ .................. C08F 4/64; C08F 4/68
[52] U.S. Cl. .................. 252/429 B; 252/431 C; 526/124; 526/125; 526/127; 526/128; 252/431 R; 252/431 N
[58] Field of Search ........... 252/429 B, 429 C, 431 R, 252/431 C, 431 N

[56] References Cited

U.S. PATENT DOCUMENTS

| | | | |
|---|---|---|---|
| 3,670,043 | 6/1972 | Kubicek et al. | 252/429 B X |
| 3,676,418 | 7/1972 | Tashiro et al. | 252/429 B X |
| 3,784,481 | 1/1974 | Lassau et al. | 252/429 B X |
| 3,823,196 | 7/1974 | Morikawa et al. | 252/429 B X |
| 4,004,071 | 1/1977 | Aishima et al. | 252/429 C X |
| 4,027,089 | 5/1977 | Aishima et al. | 252/429 B X |

*Primary Examiner*—Patrick Garvin
*Attorney, Agent, or Firm*—Sprung, Felfe, Horn, Lynch & Kramer

[57] ABSTRACT

A catalyst useful for polymerizing olefins, capable of providing an extremely high catalyst efficiency, excellent grain size and high bulk density of polymer; production of polymer having various molecular weight distributions from a broader range to a narrower range and controlling of die swell of formed polymer, by using a mechanical grinding and contacting means. Said catalyst shows a high activity and higher stereoregularity in the polymerization of polypropylene when it is used together with an electron donor compound.

Said catalyst comprises a solid catalyst component (A) and an organometallic compound (B), said catalyst component (A) is obtained by reacting a specified organomagnesium component (i) with a specified chlorosilane compound (ii) and reacting and/or grinding-contacting the solid obtained by the reaction of (i) and (ii) with a titanium and/or vanadium compound containing at least one halogen atom.

The organomagnesium component is of the formula $$M_\alpha Mg_\beta R_p^1 R_q^2 X_r Y_s$$

wherein $\alpha$ is a number of 0 or greater than 0; $\beta > 0$; p, q, r and s are each a number of 0 or greater; $p+q+r+s = m\alpha + 2\beta$ wherein m is the valency of M; M is a metal element of the 1st to the 3rd group of the Periodical Table; $R^1$ and $R^2$ are the same or different hydrocarbon radicals having 1 to 20 carbon atoms; X and Y are the same or different radicals selected from the group consisting of halogen, $OR^3$, $OSiR^4R^5R^6$, $NR^7R^8$ and $SR^9$ wherein $R^3$, $R^4$, $R^5$, $R^6$, $R^7$ and $R^8$ are each hydrogen atom or a hydrocarbon radical having 1 to 20 carbon atoms and $R^9$ is a hydrocarbon radical having 1 to 20 carbon atoms, and chlorosilane is of the formula $$H_a SiCl_b R_{4-(a+b)}$$

wherein a and b are each a number greater than 0, having the relationships $a \leq 2$ and $a+b \leq 4$ wherein R is a hydrocarbon radical having 1 to 20 carbon atoms.

16 Claims, No Drawings

CATALYST USEFUL FOR POLYMERIZING OLEFINS

DESCRIPTION OF THE INVENTION

This invention relates to a novel solid catalyst useful for polymerizing olefins, having a high activity and provides polymer of nice grain size. More particularly, it relates to a polymerization catalyst comprising said solid catalyst as a component and as another component, an organometallic compound and also to a method for polymerizing olefins by using said catalyst.

For low pressure production methods of polyolefin in which a catalyst comprising a transition metal of the 4th to 6th A group of the Periodical Table, and an organometallic compound of the 1st to 3rd group of the Periodical Table is used, a great number of catalysts have been proposed and developed since the discovery thereof made by Karl Ziegler. However, most of the catalytic systems require the step of removing catalyst from formed polymer due to insufficiency of activity which makes the production cost of the polymer higher.

In this connection, the development of a higher activity catalyst which enables to omit the catalyst removal step to simplify the process, has been prevailing with the object of reduction of cost.

Thus the catalytic systems in which a reaction product of an inorganic or organomagnesium compound and a titanium or vanadium compound is used have been proposed.

However, the necessity of cost reduction for polymer production is steadily rising.

On this account, a further improvement of catalysts has become extremely important problem. In other words improvement and advancement over not only the activity of a catalyst per g transition metal, but also grain size, bulk density, molecular weight distribution, die swelling, stability of catalyst and all the characteristic properties required as an industrial catalyst are being pursured. Accordingly, it is the present status of this industry that long range continued stable operation of slurry polymerization process as well as the improvement of properties of particles such as uniformity of grain size of formed polymer, increase of bulk density in view of the efficiency of the process have now become very important together with the necessity of higher activation which enables to omit the catalyst removal step.

A method for producing polyolefin under a lower pressure using a catalyst obtained by reacting an organomagnesium compound, preferably a solution of an organomagnesium complex soluble in an inert hydrocarbon medium with an organoaluminum halide to produce a base solid of halogen-containing magnesium compound which is further reacted with a transition metal compound such as titanium and the like has been well known by Japanese patent publication No. 11672 of 1976. This catalyst has a considerably high activity per g transition metal but it is necessary to increase the activity further for completely omitting a catalyst removal step in the polyethylene production process. Further since an organoaluminum halide is used as a reaction agent, the performance of the catalyst was insufficient due to poor grain size distribution and poor bulk density of polymer.

There is also a discovery of the catalyst prepared by treating magnesium halide with a compound represented by the general formula $Si(OR)_nX_{4-n}$ wherein X is a halogen, and having the treated product carry a titanium or vanadium compound (see Japanese patent publication No. 37194 of 1976) but this catalyst is not satisfactory in the point of activity.

We have been studying various kinds of organomagnesium compounds and various kinds of reacting agents in order to overcome the above-mentioned points and as the result of the investigation, it has now been found that a specified solid obtained by reacting, as a reacting agent, a chlorosilane compound containing Si—H bond, with an organomagnesium component, particularly a solution containing an organomagnesium component soluble in an inert hydrocarbon medium to prepare a base solid of a halogen-containing magnesium compound, and reacting said base solid with a transition metal compound such as titanium or the like and/or grinding the former with the latter to effect contact therebetween is a highly active catalyst having a good grain size, which is capable of varying the molecular weight distribution of formed polymer and controlling the die swell and thus completed the present invention.

Namely, the present invention resides in a catalyst useful for polymerizing olefins comprising a catalyst solid component (A) and an organometallic compound (B); said catalyst solid component (A) being obtained by reacting an organomagnesium component (i) represented by the general formula $M_\alpha Mg_\beta R_p^1 R_q^2 X_r Y_s$ wherein $\alpha$ is 0 or a number greater than 0; p, q, r and s are 0 or number greater than 0, having the relationship of $p+q+r+s = m\alpha + 2\beta$, wherein m is the valency of M; M is a metal atom of the first to the 3rd group of the Periodical Table, $R^1$ and $R^2$ are the same or different hydrocarbon radicals having 1-20 carbon atoms; X and Y are the same or different radicals, selected from the group consisting of halogen, $OR^3$, $OSiR^4R^5R^6$, $NR^7R^8$, and $SR^9$ wherein $R^3$, $R^4$, $R^5$, $R^6$, $R^7$ and $R^8$ is a hydrogen atom or hydrocarbon radical having 1-20 carbon atoms and $R^9$ is a hydrocarbon radical having 1-20 carbon atoms, with a Si—H bond-containing chlorosilane compound (ii) having the general formula $H_a SiCl_b R_{4-(a+b)}$ wherein a and b are numbers greater than 0, having the relationships of $0 < a \leq 2$ and $a+b \leq 4$, and R is a hydrocarbon radical having 1-20 carbon atoms to form a solid (1) and reacting said solid (1) with a titanium or vanadium compound (2) containing at least one halogen atom, and a method for polymerizing olefins in the presence of said polymerization catalyst.

The first feature of the present invention is an extremely high catalyst efficiency per g transition metal. As evident from the specific examples hereinafter described, the catalyst efficiency reaches a value more than 100,000 g polymer per g transition metal per hour per ethylene pressure (1 kg/cm²). The complete omission of catalyst removal step is possible.

The second feature of the present invention is the attainment of production of polymer powder having excellent grain size and high bulk density.

The third feature of the present invention is the capability of producing polymer having a wide range of molecular weight distribution from broader molecular weight distribution to narrower molecular weight distribution by way of the catalyst of the present invention. This can be put into practice by the treatment of the solid catalyst (A) of the present invention with an inorganic or organoaluminum, tin or silicon compound. The control of the molecular weight distribution can be also made by the catalyst synthesis condition.

The fourth feature of the present invention is the capability of controlling die swell of formed polymer by using a mechanical grinding — contacting means such as a ball mill and the like at the time of preparation of the solid catalyst of the present invention.

The fifth feature of the present invention is the capability of providing a catalyst which shows higher stereoregularity and higher activity in the polymerization of propylene by the concurrent use of an electron donor compound at the time of synthesis of the solid catalyst.

The principal cause of the astonishing performance of the catalyst of the present invention such as those described above, is not yet definite but it is believed to be due to the fact that an active halogenated magnesium base solid having a high surface area and containing an alkyl radical possessing reduction power is synthesized, as seen from examples mentioned below.

The above-mentioned feature of the present invention will be illustrated by way of specific examples and comparative examples hereinafter described. In these examples, MI shows a melt index, which is a value under the conditions of a temperature of 190° C. and a load of 2.16 kg according to ASTM D-1238, FR means a quotient obtained by dividing a value measured at a temperature of 190° C. and a load of 21.6 kg by MI. It is one of a measure of molecular weight distribution. This means that the higher the value, the broader the distribution. SR shows the weight (g) of total 10 cm of molten polymer strand which has flown out of a melt-indexer under a high load of 21.6 kg and is one of a measure of relative swell ratio. As evident from the comparison of specific example 1 and comparative examples 1 and 2, compared with the case of the use of an organoaluminum halide as a reacting agent as in Japanese patent publication No. 11672 of 1976, the case of the use of a chlorosilane compound provides notable increase of catalyst performance such as higher catalyst efficiency, uniform grain size of polymer, higher bulk density and broader molecular weight distribution. In this regard the latter case is commercially very advantageous. Further the higher activity and higher stereoregularity in the polymerization of propylene is evident from examples 34–43.

The description will be given with regard to organomagnesium component (i) having the general formula $M_\alpha Mg_\beta R_p^1 R_q^2 X_r Y_s$ (wherein $\alpha$, $\beta$, p, q, r, s, M, $R^1$, $R^2$, X and Y have the same meaning as above-mentioned) which is used in the synthesis of the solid catalyst of the prrsent invention.

The component (1) is shown in the form of a complex compound of an organomagnesium but includes so-called Grignard compound RMgX, R$_2$Mg and all the complexes of these compounds with other organic compounds. The hydrocarbon radicals represented by $R^1$–$R^9$ in the above-mentioned formula, include alkyl, cycloalkyl, and aryl radical, for example, methyl, ethyl, propyl, butyl, amyl, hexyl, octyl, decyl, dodecyl, cyclohexyl and phenyl radical, and the like. It is particularly preferable that $R^1$ is an alkyl radical. It does not matter even if $R^3$–$R^8$ are hydrogen atoms. As halogen, chlorine, fluorine, bromine and iodine are used but chlorine is particularly preferable.

As metal atom M, any metal element of the first to the third group of the Periodical Table can be used. For example, sodium, potassium, lithium, calcium, beryllium, zinc, barium, boron, aluminum and the like can be mentioned.

Further there are relationships that $\beta/\alpha$ is 0.1 or greater, preferably 0.5 or greater and $(r+s)/(\alpha+\beta)$ is in the range of 0–2.0.

As catalyst components to be used in the present invention, organomagnesium complexes or compounds soluble in an inert hydrocarbon medium are preferable. As such organomagnesium complexes, those complexes in which M is either of aluminum, zinc, boron or beryllium, the ratio of magnesium to metal atom M, $\beta/\alpha$, is 0.5 or greater, particularly 1–10, the ratio of the sum of the radicals X+Y to the sum of metal atoms, $(r+s)/(\alpha+\beta)$, is 0 or greater and 1.0 or less, preferably 0–0.8 (inclusive) and X and Y are radicals other than halogen in the above-mentioned general formula are used.

As organomagnesium compounds, dialkyl magnesium compounds of the above-mentioned general formula, in which $\alpha=0$, $r+s=0$, $R^1$ and $R^2$ are alkyl radicals, and alkoxy- and siloxymagnesium compounds in which $\alpha=0$, $r+s/\beta=1$, and X and Y are $OR^3$ or $OSiR^4R^5R^6$ are used. As such compounds, (sec-C$_4$H$_9$)$_2$Mg, (tert-C$_4$H$_9$)$_2$Mg, n-C$_4$H$_9$MgC$_2$H$_5$, n-C$_4$H$_9$Mgsec-C$_4$H$_9$, n-C$_4$H$_9$Mg-tert-C$_4$H$_9$, n-C$_6$H$_{13}$MgC$_2$H$_5$, n-C$_8$H$_{17}$MgC$_2$H$_5$, (n-C$_6$H$_{13}$)$_2$Mg, (n-C$_8$H$_{17}$)$_2$Mg, (n-C$_{10}$H$_{21}$)$_2$Mg, n-C$_4$H$_9$(OC$_3$H$_7$), n-C$_4$H$_9$Mg(OC$_4$H$_9$), n-C$_4$H$_9$Mg(OC$_5$H$_{11}$), n-C$_4$H$_9$Mg(OC$_6$H$_{13}$), n-C$_4$H$_9$Mg(OC$_8$H$_{17}$), C$_5$H$_{11}$Mg(OC$_4$H$_9$), C$_6$H$_{13}$Mg(OC$_3$H$_7$), n-C$_4$H$_9$Mg(OSiH.CH$_3$.C$_4$H$_9$), n-C$_4$H$_9$Mg(OSi.H.C$_6$H$_5$.C$_4$H$_9$) and the like are mentioned.

As compounds of this kind, a complex compound of alkylmagnesium halide or dialkylmagnesium with a Lewis base such as an ether, ketone, amine or the like or a solution of these compounds in ether is also useful.

Among the above-mentioned organomagnesium component, those which are particularly preferable are the complexes represented by the general formula described above and consisting of compounds of two metals of M and Mg which are soluble in an inert hydrocarbon.

These organomagnesium compounds or organomagnesium complexes are synthesized by reacting an organomagnesium compound represented by the general formula, $R^1MgQ$ or $R_2^1Mg$ (wherein $R^1$ has the same meaning as above-mentioned and Q is a halogen) with an organometallic compound represented by the general formula $MR_m^2$ or $MR_{m-1}^2H$ wherein M, $R^2$ and m have the same meanings as above-mentioned, in an inert hydrocarbon medium such as hexane, heptane, cyclohexane, benzene, toluene or the like at a temperature in the range from room temperature to 150° C. and if necessary further reacting the resulting reaction product with an alcohol, water, siloxane, amine, imine, mercaptan or a dithiocompound.

The organomagnesium compounds or organomagnesium complexes can further be synthesized by the reaction of (MgX$_2$ or $R^1$MgX) with (MR$_m^2$ or MR$_{m-1}^2$H); or ($R^1$MgX or MgR$_2^1$) with R$_n^2$MX$_{m-n}$; or ($R^1$MgX or MgR$_2$) with Y$_n$MX$_{m-n}$ (wherein R, $R^1$, $R^2$, X and Y are as above-mentioned and include the cases where X and Y are halogen, and n is a number of 0 — m).

The description will be given with regard to chlorosilane compounds (ii) containing Si-H bond, represented by the general formula $H_aSiCl_bR_{4-(a+b)}$ wherein a, b and R have the same meanings as above-mentioned.

The hydrocarbon radicals represented by R in the above-mentioned formula, include alkyl, cycloalkyl, aryl, for example, methyl, ethyl, propyl, butyl, amyl, hexyl, decyl, cyclohexyl, phenyl radicals and the like. Preferably the hydrocarbon radical is alkyl containing 1-20 carbon atoms and a lower alkyl group such as methyl, ethyl, propyl or the like is particularly preferable. The ranges of the values of a and b are defined by $a>0$, $b>0$, $a+b\leq 4$, and $0<a\leq 2$.

As such compounds, $HSiCl_3$, $CH_3SiHCl_2$, $C_2H_5SiHCl_2$, $n-C_3H_7SiHCl_2$, $i-C_3H_7SiHCl_2$, $n-C_4H_9SiHCl_2$, $i-C_4H_9SiHCl_2$, $C_6H_5SiHCl_2$, $4-ClC_6H_4SiHCl_2$, $CH_2=CHSiHCl_2$, $C_6H_5CH_2SiHCl_2$, $1-C_{10}H_7SiHCl_2$, $CH_2=CHCH_2SiHCl_2$, $CH_3SiH_2Cl$, $C_2H_5SiH_2Cl$, $(CH_3)_2SiHCl$, $(CH_3)(i-C_4H_9)SiHCl$, $(CH_3)(C_6H_5)SiHCl$, $(C_2H_5)_2SiHCl$, $(C_6H_5)_2SiHCl$, alone or a mixture of these compounds or a mixture partially containing any of these compounds are preferable. As particularly preferable chlorosilane compounds, trichlorosilane, monomethyldichlorosilane, dimethylchlorosilane, ethyldichlorosilane can be mentioned.

Description will be given with regard to titanium or vanadium compound (2) containing at least one halogen atom.

As compounds of this kind, titanium tetrachloride, titanium tetrabromide, titanium tetraiodide, ethoxytitanium trichloride, propoxytitanium trichloride, butoxytitanium trichloride, dibutoxytitanium dichloride, tributoxytitanium monochloride, titanium trichloride, co-crystal of titanium trichloride and aluminum trichloride, vanadium tetrachloride, vanadyl trichloride, monobutoxy vanadyl dichloride, dibutoxyvanadyl dichloride and the like, a halogen compound, an oxyhalogen compound and an alkoxyhalogen compound of titanium or vanadium, are used solely or in the form of mixture. Preferable compounds are those which contain 3 or more of halogen atoms. Particularly preferable is titanium tetrachloride or trichloride.

The description will be given for the reaction between an organomagnesium component (i) and a chlorosilane compound (ii) and the solid catalyst component [A] obtained from the base solid (1) formed by the above-mentioned reaction of (i) and (ii) and a halogen compound of titanium and/or vanadium (2).

The reaction between an organomagnesium compound or organomagnesium complex (i) and a chlorosilane compound (ii) can be carried out in an inert reaction medium e.g. an aliphatic hydrocarbon such as hexane, heptane, an aromatic hydrocarbon such as benzene, toluene, xylene, an alicyclic hydrocarbon such as cyclohexane, methylcyclohexane or an ether type medium such as ether, tetrahydrofuran and the like, or a mixture of these compounds.

From the point of catalyst performance, an aliphatic hydrocarbon medium is recommended.

With regard to the reaction temperature, there is no particular limitation but from the point of the reasonable rate of reaction, the reaction is preferably carried out at a temperature of 40° C. or higher. With regard to the reaction ratio of the two components, there is no particular limitation but it is recommended to use preferably the range of 0.01 mol to 100 mols chlorosilane component and most preferably 0.1 mol to 10 mols relative to one mol of the organomagnesium component.

With regard to the reaction method, either of, a simultaneous addition method in which 2 kinds of the catalyst components are at the same time introduced into a reaction zone or so-called normal addition method or a reverse addition method in which one kind of catalyst component is introduced in a reaction zone in advance and the remaining kind of catalyst component is reacted while being introduced into the reaction zone is possible and provides preferable result. When an organomagnesium compound is insoluble, it is possible also to use a chlorosilane compound as a reaction agent in the reaction medium in the form of heterogeneous treatment reaction. Also in such an occasion, the above-mentioned conditions of temperature, mol, and reaction ratio, are preferable.

The structure and composition of the base solid material obtained according to the above-mentioned reaction, may vary according to the kinds of starting raw materials and reaction conditions, but it is assumed from the analytical value of composition that the material is halogenated magnesium compound having about 0.1-2.5 millimol of alkyl radical having Mg-C bond per g solid material. This base solid has an extremely large specific surface area showing a value as high as 100-300 $m^2/g$ according to the measurement by B.E.T. method. According to the present invention, a base solid of halogenated magnesium having a larger surface area which has been heretofore a material which it has been regarded to be difficult to produce can be easily produced.

The description will be made for the production of catalyst solid by way of the contact reaction of the base solid (1) obtained by the above-mentioned reaction with a titanium or vanadium compound (2). For the contact of the base solid with a titanium or vanadium compound, any one of the method in which a titanium or vanadium compound is subjected to contact reaction in liquid phase and the method in which a titanium or vanadium compound is used in solid phase and subjected to mechanical grinding procedure such as ball-milling or the like to effect intimate contact and the method in which the above-mentioned methods are both used in combination, are useful. When a titanium or a vanadium compound is subjected to a contact reaction in liquid phase, reaction is carried out by using an inert reaction medium or by using undiluted titanium or vanadium compound itself as a reaction medium without using an inert reaction medium. As an inert reaction medium, an aliphatic hydrocarbon such as hexane, heptane, an aromatic hydrocarbon such as benzene, toluene, xylene, an alicyclic hydrocarbon such as cyclohexane, methylcyclohexane can be mentioned but an aliphatic hydrocarbon is preferable.

With regard to the temperature at the time of contact reaction and the concentration of titanium or vanadium compound, there are no particular limitations but it is recommended to carry out the contact reaction at a temperature of preferably 100° C. or higher with a concentration of titanium or vanadium compound of 4 mol/liter or more and preferably by using undiluted titanium or vanadium compound itself as a reaction medium. With regard to the mol ratio of reactants, preferable result can be obtained by carrying out the reaction in the presence of a sufficiently excessive amount of titanium or vanadium compound relative to the magnesium component in the base solid.

On the other hand, when a titanium or vanadium compound is used in a solid phase, it is possible to use, as a method for subjecting it to intimate contact with a base solid, well known mechanical grinding procedure such as a revolving ball mill, a vibration ball mill. As for the grinding-contacting conditions, there is no particular limitation, but considering from the point of catalyst efficiency per transition metal, it is preferable to reduce the amount of titanium or vanadium compound.

In the production of the catalyst of the present invention, it does not matter even if the above-mentioned various kinds of contacting means are used in combination or simultaneously. For example, it is possible to adopt a method in which a catalyst solid obtained by subjecting a titanium compound to contact reaction in liquid phase is ground singly in a ball mill or together with a solid titanium compound. If these mechanical grinding procedures are used in combination or simultaneously used for contacting in the production of the catalyst of the present invention, it is very effective because the die swell of formed polymer can be controlled.

The composition and structure of the solid catalyst obtained by the various kinds of above-mentioned contact reaction vary according to the kinds of starting raw materials and synthesis conditions, but it has been revealed from the analytical values of composition that the solid catalyst contains about 0.5–10% by weight of titanium and has a large surface area in the range of 30–300 m²/g.

It is possible to vary the molecular weight distribution of polyethylene and the control of properties of grain by treating the solid catalyst further with inorganic or organoaluminum, tin, silicon compound and the like.

A catalyst for polymerizing propylene, which shows higher activity and higher stereoregularity can be prepared by using an electron-donor compound concurrently at the time of synthesis of the solid catalyst. As electron-donor compounds, well known compounds such as amines, ethers, ester, aromatic compounds, etc., particularly carboxylic acids and their derivatives are preferable. As carboxylic acids and their derivatives, aliphatic, alicyclic and aromatic, saturated and unsaturated mono- and polycarboxylic acids and their derivatives such as carboxylic halides, carboxylic anhydrides and carboxylic esters can be mentioned.

As the carboxylic acid, for example, formic acid, acetic acid, propionic acid, butyric acid, valeric acid, oxalic acid, malonic acid, succinic acid, maleic acid, acrylic acid, benzoic acid, toluic acid, terephthalic acid, etc. can be mentioned. Among them, benzoic acid and toluic acid are preferable.

As the carboxylic halide, for example, acetyl chloride, propionyl chloride, n-butyryl chloride, isobutyryl chloride, succinyl chloride, benzoyl chloride, tolyl chloride, etc. can be mentioned. Among them aromatic carboxylic acid halides such as benzoyl chloride, tolyl chloride are particularly preferable.

As carboxylic anhydride, for example, acetic anhydride, propionic anhydride, n-butyric anhydride, succinic anhydride, maleic anhydride, benzoic anhydride, phthalic anhydride, etc. can be mentioned. Among them, benzoic anhydride is particularly preferable.

As carboxylic acid ester, for example, methyl formate, methyl acetate, ethyl acetate, n-propyl acetate, ethyl propionate, ethyl n-butyrate, ethyl valerate, ethyl capronate, ethyl heptanoate, di-n-butyl oxalate, monoethyl succinate, diethyl succinate, ethyl malonate, di-n-butyl malate, methyl acrylate, ethyl acrylate, methyl methacrylate, methyl benzoate, ethyl benzoate, n- and isopropyl benzoate, n-, i- sec.- and tert. butyl benzoate, methyl p-toluylate, ethyl p-toluylate, i-propyl p-toluylate, n-, and i-amyl toluylate, ethyl o-toluylate, ethyl m-toluylate, methyl p-ethylbenzoate, ethyl p-ethylbenzoate, methyl anisate, ethyl anisate, i-propylanisate, methyl p-ethoxybenzoate, ethyl p-ethoxybenzoate, methyl terephthalate, etc. can be mentioned. Among them, esters of aromatic carboxylic acid are preferable, particularly, methyl benzoate, ethyl benzoate, methyl p-toluylate, ethyl p-toluylate, methyl anisate, ethyl anisate are preferable.

Description will be given with regard to the synthesis method of solid component obtained by reacting the above-mentioned solid material (1), titanium compound (2), carboxylic acid or its derivative (3) and/or grinding these substances.

For the reaction of the base solid (1) obtained by the reaction of an organomagnesium component and a chlorosilane compound, (2) a titanium compound containing at least one halogen atom and (3) an electron donor compound, any of a reaction method in which reaction is carried out in a liquid phase or a gas phase and a method in which a liquid phase or gase phase reaction is combined with grind-contacting reaction and the like can be used. The reaction can be carried out in accordance with the above-mentioned synthesis method of [A] component.

The solid catalyst [A] of the present invention is useful as a catalyst for polymerization of olefins as it is but it can be converted into more superior catalyst by combining it with an organometallic compound [B]. As organometallic compound [B] a complex containing a compound of metals of the first to 3rd group of the Periodical Table particularly an organoaluminum compound and a complex containing organomagnesium is preferable. As organoaluminum compound, a compound represented by the general formula $AlR_t^{10}Z_{3-t}$ wherein $R^{10}$ is a hydrocarbon radical having 1–20 carbon atoms; Z is a member selected from the group consisting of hydrogen, halogen, alkoxy, aryloxy and siloxy and t is a number of 2–3 (inclusive) is used solely or in the form of a mixture.

In the above-mentioned formula a hydrocarbon radical having 1–20 carbon atoms, represented by $R^{10}$ includes aliphatic hydrocarbon, aromatic hydrocarbon and alicyclic hydrocarbon.

Illustratives of these compounds are for example triethylaluminum, trinormalpropylaluminum, triisopropylaluminum, trinormalbutylaluminum, triisobutylaluminum, trihexylaluminum, trioctylaluminum, tridecylaluminum, tridodecylaluminum, trihexadecylaluminum, diethylaluminum hydride, diisobutylaluminum hydride, diethylaluminum ethoxide, diisobutylaluminum ethoxide, dioctylaluminum butoxide, diisobutylaluminum octyloxide, diethylaluminum chloride, diisobutylaluminum chloride, dimethylhydrosiloxyaluminum dimethyl, ethylmethylhydrosiloxyaluminum diethyl, ethyldimethylsiloxyaluminum diethyl, aluminum isoprenyl and the like and mixtures of these compounds.

By combining these alkylaluminum compounds with the above-mentioned solid catalyst, highly active catalyst can be obtained but trialkylaluminum and dialkylaluminum hydride are preferable because highest activity can be attained by these compounds.

The complex containing organomagnesium is a complex compound soluble in a hydrocarbon medium and represented by the general formula $M_\alpha Mg_\beta R_p^1 R_q^2 X_r Y_s$ wherein $\alpha$ and $\beta$ are a number greater than 0, $\beta/\alpha$ is in the range of 0.1–10, p, q, r and s are 0 or a number greater than 0 having the relationships of $p+q+r+s = m\alpha + 2\beta$, and $0 \leq (r+s)/(\alpha+\beta) < 1.0$ wherein m is the valency of M, M is aluminum, zinc, boron or beryllium atom, $R^1$ and $R^2$ are the same or different hydrocarbon radicals having 1-10 carbon atoms, X and Y are the same or different radicals and represent $OR^3$, $OSiR^4R^5R^6$, $NR^7R^8$ and $SR^9$, and $R^3$, $R^4$, $R^5$, $R^6$, $R^7$ and $R^8$ represent hydrogen atom or hydrocarbon radicals having 1-10 carbon atoms and $R^9$ is a hydrocarbon radical having 1-10 carbon atoms. A complex in which M is aluminum is particularly preferable.

The solid catalyst component [A] and the organometallic compound [B] can be added to the polymerization system under polymerization conditions but they can be combined in advance of polymerization. The ratio of two components to be combined is preferable to be in the range of 1-3,000 millimol of organometallic compound based upon 1 g of the solid catalyst.

The olefin which can be polymerized with the catalyst of the present invention is α-olefin, particularly ethylene or propylene. It is also possible to use for polymerizing ethylene or propylene in the co-existence of monoolefin such as propylene, butene-1, hexene-1, or diene such as butadiene, isoprene and further for polymerizing diene.

As polymerization processes, conventional suspension polymerization, solution polymerization and gas phase polymerization are feasible. In case of suspension polymerization and solution polymerization, a catalyst is introduced into a polymerization vessel together with a solvent, for example, an aliphatic hydrocarbon such as hexane, heptane, an aromatic hydrocarbon such as benzene, toluene, xylene, and an alicyclic hydrocarbon such as cyclohexane, methylcyclohexane and ethylene or propylene is charged under a pressure of 1-20 kg/cm² and polymerization can be carried out at a temperature in the range of room temperature to 150° C. On the other hand, in the gas phase polymerization, polymerization can be carried out by taking a proper means such as a fluidized bed, a moving bed or a stirrer which enables to contact ethylene or propylene with a catalyst under a pressure of 1-50 kg/cm² and at a temperature of room temperature to 120° C.

The polymerization can be carried out by way of one step polymerization which uses one reaction zone or by way of a multiple step polymerization which uses a multiplicity of reaction zones.

The catalyst of the present invention enables to produce polymers having a considerably broad molecular weight distribution by a common one step polymerization but enables to produce polymers having a further broad molecular weight distribution by using a multiple step polymerization in which polymerization is carried out under two or more different reaction conditions, and such polymers are extremely suitable for articles produced by blow molding or film molding process.

It is possible to add hydrogen, halogenated hydrocarbon or an organometallic compound which is liable to cause chain-transfer, in order to control the molecular weight of polymer. It is also possible to carry out polymerization in combination with a process which enables to control the density by adding an ester of titanic acid and other like process.

Following examples are given to illustrate the catalyst of the present invention and the use thereof but it is not intended to limit the scope by these examples. In the examples MI, FR, and SR have the above-mentioned meaning and catalyst yield is expressed by the amount of polymer produced per 1 g of a transition metal component per 1 hour per 1 kg/cm² of ethylene or propylene pressure.

EXAMPLE 1

(I) Synthesis of hydrocarbon soluble organomagnesium complex

Di-n-butyl magnesium (13.80 g) and triethylaluminum (1.90 g) were charged into a 200 ml volume flask having been purged with nitrogen together with heptane (100 ml) and reacted at 80° C. for two hours to obtain a solution of an organomagnesium complex. Analysis showed that the complex had a composition of $AlMg_{6.0}(C_2H_5)_{2.9}(n-C_4H_9)_{12.1}$ and the concentration of the organometal was 1.16 mol/l.

(II) Preparation of solid material

Oxygen and moisture in a 200 ml volume flask fitted with a dropping funnel and a water cooled reflux condenser were purged with dry nitrogen, and under nitrogen atmsophere, 50 mmol of trichlorosilane ($HSiCl_3$) solution in heptane (1 mol/l) was charged in the flask and heated to 50° C. Next, the solution of 50 mmol of said organomagnesium complex was measured and taken up into the dropping funnel, added thereto dropwise with stirring over one hour at 50° C., and further reacted therewith at this temperature for one hour. Resulting hydrocarbon insoluble white precipitate was isolated, washed with hexane, and dried to obtain a white solid material. Analysis showed that 1 g of this solid contained 9.20 mmol of Mg, 19.20 mmol of Cl, 1.70 mmol of Si and 0.94 mmol of alkyl group, and specific surface area measured by B.E.T. method was 270 m²/g.

(III) Synthesis of solid catalyst

To a pressure proof ampoule having been purged with nitrogen was charged 2.0 g of the above mentioned solid material and 30 ml of titanium tetrachloride. After reaction was conducted with stirring at 130° C. for two hours, solid portion was isolated by filtration, washed thoroughly with hexane, and dried, and a pale red-violet solid catalyst was obtained. Analysis of this solid catalyst showed that it contained 2.5% by weight of Ti and that the specific surface area measured by B.E.T. method was 210 m²/g.

(IV) Polymerization

The solid catalyst prepared according to a procedure of (III) (10 mg) and triisobutylaluminum (0.4 mmol) together with dehydrated and deaerated hexane (0.8 l) were charged into a 1.5 l volume autoclave which had been deaerated to vacuum and purged with nitrogen. While keeping the temperature inside the autoclave at 80° C., hydrogen pressure and ethylene pressure were increased to 1.6 kg/cm² and 2.4 kg/cm², respectively, adjusting the total pressure to a pressure of 4.4 kg/cm² (gauge). While keeping the total pressure at 4.4 kg/cm² (gauge) by supplying ethylene, polymerization was conducted for one hour to obtain 75 g of a polymer. The efficiency of the catalyst was 125,000 g/g-titanium component.hour.ethylene pressure, MI was 0.30, FR was 68 and SR was 0.59. The resulting polymer had a bulk density of 0.343 g/cm³, powder of 35-150 mesh particle size occupied 93% by weight and showed excellent particle characteristics.

COMPARATIVE EXAMPLE 1

According to the prior art patent literature using ethylaluminum dichloride as a reaction reagent (Japanese Patent Publication No. 51 (1976)-11672, Example 5), catalyst synthesis was conducted as follows:

Namely, a solution of organomagnesium complex which was the same as described in above Example 1 of the present invention and ethylaluminum dichloride were reacted in a molar ratio of 1:4 at 40° C. for two hours to prepare a base solid. To the resulting reaction liquid in the form of slurry, titanium tetrachloride was added so as to give a molar ratio of Ti:Mg of 1:6.6, and the reaction was carried out at 40° C. for one hour to synthesize a slurry of catalyst solid. Using 0.01 mmol of Ti equivalent of thus synthesized catalyst solid slurry and 1.6 mmol of triisobutylaluminum, polymerization was conducted in the same manner as Example 1 to obtain 57 g of a polymer.

The efficiency of the catalyst was as low as 49,500, MI was 0.52, and FR was only 41. The bulk density of the resulting polymer was as small as 0.237 g/cm$^3$, the proportion of 35–150 mesh size powder was as small as 57%, and particle characteristics were poor. Additionally, isolation and analysis of this solid catalyst showed a Ti content of 2.0% by weight and a specific surface area as small as 53 m$^2$/g.

COMPARATIVE EXAMPLE 2

According to Example 1 except for using as a reaction reagent ethylaluminum dichloride in place of trichlorosilane, catalyst preparation as well as polymerization were conducted. Analysis of the catalyst solid showed a Ti content of 17.3% by weight and a specific surface area of 46 m$^2$/g. The yield of polymer was as small as 13 g, the catalyst efficiency was as low as 3,100, MI was 0.27 and FR was 52. The bulk density of the polymer was 0.205 g/cm$^3$, the proportion of 35–150 mesh size powder was 28%, aggregation of powder and adhesion to the polymerization reactor were drastic and particle characteristics were poor.

EXAMPLES 2–16

Following the procedure of Example 1, catalyst preparation and polymerization were conducted and the results shown in Table 1 were obtained. Further catalyst synthesis and polymerization were conducted using the compounds and conditions shown in Table 1.

Table 1

| | Catalyst Solid Catalyst | | | | | | | |
|---|---|---|---|---|---|---|---|---|
| Example | Organomagnesium compound | Silane compound | Molar ratio Mg/Si | Temperature (°C.) × hour | Ti, V compound (conc) | Temperature (°C.) × hour | Ti+V % by weight | Specific surface area (m$^2$/g) |
| 2 | AlMg$_{6.0}$Et$_{2.9}$n-Bu$_{12.1}$ | HSiCl$_3$ | 1/4 | 40×2 | TiCl$_4$ (neat) | 130×2 | 2.5 | 203 |
| 3 | AlMg$_{6.0}$Et$_{2.0}$n-Bu$_{9.5}$(OBu)$_{3.5}$ | HSiCl$_3$ | 5/1 | 50×2 | TiCl$_4$ (neat) | 120×3 | 2.2 | 220 |
| 4 | AlMg$_{6.0}$Et$_{2.9}$n-Bu$_{12.1}$ | HSiCl$_2$Me | 1/1 | 50×2 | TiCl$_4$ (4 mol/l) | 130×2 | 5.1 | 215 |
| 5 | ZnMg$_{2.0}$Et$_{2.0}$n-Bu$_{3.9}$ | HSiCl$_3$ | 2/1 | 80×2 | TiCl$_4$ (neat) | 110×4 | 2.3 | 176 |
| 6 | AlMg$_{4.0}$Et$_{2.9}$(n-Hexyl)$_{8.0}$ | HSiCl$_3$ | 1/3 | 50×2 | equivalent mol mixture of TiCl$_4$ and VCl$_4$ (neat) | 130×2 | 1.5 | 207 |
| 7 | BeMg$_{4.0}$Et$_{0.7}$n-Pr$_{6.3}$—[N—(nBu)$_2$]$_{3.0}$ | HSiClEt$_2$ | 1/1 | 80×5 | TiCl$_4$ (neat) | 130×2 | 2.8 | 194 |
| 8 | BMgEt$_{2.8}$n-Pr$_{1.5}$(SEt)$_{0.7}$* | HSiCl$_3$ | 1/1 | 50×5 | equivalent mol mixture of TiCl$_4$ and VOCl$_3$ (neat) | 130×2 | 6.2 | 172 |
| 9 | AlMg$_{6.0}$Et$_{2.0}$n-Bu$_{9.5}$(OSi(H)(Me)—Et)$_{3.5}$ | HSiCl$_3$ | 2/1 | 50×5 | TiCl$_2$—(OBu)$_2$ (4 mol/l) | 130×2 | 2.9 | 224 |
| 10 | AlMg$_{6.0}$Et$_{2.2}$nBu$_{8.6}$OBu$_{4.3}$ | HSiCl$_2$Me | 1/1 | 60×1 | TiCl$_4$ (neat) | 110×3 | 3.1 | 195 |
| 11 | AlMg$_{4.0}$Et$_{2.3}$nBu$_{5.2}$(OSi(H)(Me)—Bu)$_{3.5}$ | HSiCl$_3$ | 2/1 | 70×1 | TiCl$_4$ (neat) | 120×2 | 3.2 | 218 |
| 12 | Sec-Bu$_2$Mg | HSiCl$_2$Me | 1/2 | 50×2 | TiCl$_4$ (neat) | 130×1 | 2.8 | 212 |
| 13 | n-BuMg(On-Octyl) | HSiCl(Me)$_2$ | 1/3 | 50×2 | TiCl$_4$ (neat) | 130×1 | 3.2 | 185 |
| 14 | n-BuMg(OSi(Me)(H)-n-Bu) | HSiCl$_3$ | 1/1 | 50×2 | TiCl$_4$ (neat) | 130×1 | 2.9 | 230 |
| 15 | n-C$_4$H$_9$MgC$_2$H$_5$ | HSiCl$_3$ | 1/2 | 60×2 | TiCl$_4$ (neat) | 130×1 | 2.3 | 198 |
| 16 | (n-C$_6$H$_{13}$)$_2$Mg | HSiCl$_3$ | 1/2 | 60×2 | TiCl$_4$ (neat) | 130×1 | 2.1 | 176 |

Table 1-continued

| | | | | Result of polymerization | | | | | |
|---|---|---|---|---|---|---|---|---|---|
| | Catalyst | | | Catalyst efficiency | | | | Particle characteristics | |
| Example | Organometallic compound (m mole) | | Yield (g) | g/gTi,hr, Ethylene kg/cm² | MI | FR | SR | Bulk density g/cc | 35 – 150 mesh powder (%) |
| 2 | AliBu₃ | (1.6) | 66 | 110,000 | 0.12 | 67 | 0.61 | 0.323 | 92 |
| 3 | AlEt₃ | (0.4) | 82 | 150,000 | 1.42 | 28 | 0.63 | 0.342 | 93 |
| 4 | AliBu₂H | (0.4) | 187 | 153,000 | 0.33 | 61 | 0.58 | 0.338 | 94 |
| 5 | AliBu₃ | (0.4) | 65 | 118,000 | 0.23 | 70 | — | 0.310 | 93 |
| 6 | AlEt₂.₅(OEt)₀.₅ | (1.6) | 45 | 118,000 | 0.75 | 60 | — | 0.296 | 85 |
| 7 | AliBu₃ | (3.2) | 62 | 92,000 | 0.62 | 63 | — | 0.311 | 83 |
| 8 | AlEt₂.₅Cl₀.₅ | (1.6) | 146 | 98,000 | 0.28 | 71 | 0.64 | 0.301 | 82 |
| 9 | AlMg₆.₀Et₂.₉n-Bu₁₂.₁ | (0.8) | 78 | 112,000 | 1.03 | 38 | — | 0.334 | 90 |
| 10 | AlEt₃ | (1.6) | 85 | 114,000 | 2.11 | 28 | — | 0.312 | 94 |
| 11 | AlEt₃ | (1.6) | 88 | 115,000 | 1.75 | 26 | — | 0.311 | 92 |
| 12 | AliBu₃ | (0.4) | 57 | 85,000 | 0.19 | 91 | 0.64 | 0.315 | 93 |
| 13 | AlEt₃ | (0.4) | 64 | 83,000 | 0.95 | 31 | — | 0.306 | 96 |
| 14 | Al(hexyl)₃ | (1.6) | 54 | 78,000 | 0.23 | 75 | 0.59 | 0.343 | 88 |
| 15 | AliBu₃ | (1.6) | 56 | 101,000 | 0.35 | 62 | — | 0.311 | 90 |
| 16 | AliBu₃ | (1.6) | 52 | 103,000 | 0.21 | 65 | — | 0.325 | 92 |

*SEt: ethyl mercaptan radical

EXAMPLE 17

Two grams of catalyst solid synthesized in the same manner as in Example 1 and 30 ml of 0.1 mol/l solution of ethylaluminum dichloride in heptane were charged into a 100 ml ampoule and reacted at 90° C. for one hour to obtain a solid catalyst. The Ti content in the solid was 2.2% by weight, and the specific surface area of the solid was 225 m²/g. In the same manner as in Example 1 except for the use of this catalyst solid, polymerization was conducted resulting in 74 g of a polymer. The catalyst efficiency was 140,000, MI was 0.29 and FR was 78. The bulk density was 0.355 and the proportion of the 35–150 mesh size powder was 98%.

EXAMPLE 18

Using diethylaluminum chloride in place of ethylaluminum dichloride, the reaction was conducted according to Example 17 resulting in a solid catalyst. The content of Ti in the solid was 2.3% by weight, and the specific surface area was 185 m²/g. Polymerization was conducted in the same manner as Example 1 except for using this solid catalyst instead and 85 g of a polymer was obtained. Catalyst efficiency, 154,000; MI, 0.79; FR, 39; bulk density, 0.353; and proportion of 35–150 mesh powder, 96%.

EXAMPLE 19

Except for using a solution of n-butyl-magnesium-chloride-1.8 dibutylether complex in heptane in place of the solution of organomagnesium complex in heptane used in Example 1, catalyst synthesis and polymerization were carried out according to Example 1. The content of Ti in the catalyst was 2.9% by weight and the specific surface area was 165 m²/g. Yield of polymer, 45 g; catalyst efficiency, 65,000; MI, 0.27; FR, 72; bulk density of polymer, 0.306 g/cm³; proportion of 35–150 mesh powder, 87%.

EXAMPLE 20

(i) Synthesis of organomagnesium compound

A 500 ml volume flask fitted with a dropping funnel and a water cooled reflux condenser was purged with dry nitrogen, and 20.0 g of 100–200 mesh metallic magnesium powder and 300 ml of n-heptane were charged thereto. The flask was heated to 90° C. Then 0.81 mole of n-butyl chloride was measured and taken up in the dropping funnel, and it was dropped with stirring at 90° C. over one hour. After the initiation of the reaction, stirring was further continued for additional two hours at 90°–95° C. Then solid was filtered off, washed with hexane and dried. Analysis of the solid showed its composition to be Mgn-Bu₀.₉Cl₁.₁.

(ii) Synthesis of solid material with reaction reagents

Into a pressure-proof ampoule having been purged with nitrogen, were charged 50 mmol on the basis of the magnesium of the above mentioned organomagnesium compound and 100 ml of 1 mol/l trichlorosilane solution in heptane. After reacting them with stirring at 60° C. for two hours, solid portion was filtered off and washed with hexane resulting in a base solid.

(iii) Synthesis of solid catalyst and polymerization

In the same manner as Example 1 except for using the above-mentioned solid material, synthesis of catalyst solid and polymerization were conducted. The content of Ti in the catalyst solid was 3.7% by weight and the specific surface area of the catalyst solid was 107 m²/g. The results of the polymerization were as follows. Polymer yield, 46 g; catalyst efficiency, 52,000; MI, 0.46; FR, 65; bulk density, 0.305; proportion of 35–150 mesh powder, 67%.

EXAMPLE 21

Except for the use of an ethylene-butene-1 gas mixture containing 1% of butene-1 in place of ethylene, polymerization was conducted according to Example 1 using the same catalyst and the same condition.

Polymer yield, 58 g; catalyst efficiency, 96,000; MI, 0.60; FR, 52; bulk density, 0.342; proportion of 35–150 mesh powder, 92%.

EXAMPLE 22

(i) Synthesis of catalyst solid: 3.5 g of a base solid synthesized in the same manner as Example 1 (ii) and 0.5 g of titanium trichloride (Stauffer Co. AA grade) were charged into a stainless steel ball mill having a 100 cm³ volume and containing therein 25 stainless steel 9 mmφ balls under nitrogen atmosphere. By using a shaking ball mill vibrating 1,000 times/min or more, they were ground together for 5 hours and a catalyst solid was obtained. The analysis of this catalyst solid showed that it contained 3.1% by weight of Ti.

(ii) Polymerization

In a 1.5 l volume autoclave having been deaerated to vacuum and purged with nitrogen, there were placed 10 mg of the catalyst solid synthesized according to the procedure of (i) and 0.4 mmol of triisobutylaluminum together with 0.8 l of dehydrated and deaerated hexane. While keeping the inner temperature of the autoclave at 80° C., hydrogen pressure and ethylene pressure were elevated up to 1.6 kg/cm$^2$ and 2.4 kg/cm$^2$, respectively, adjusting the total pressure to 4.4 kg/cm$^2$ gauge. While keeping the total pressure at a pressure of 4.4 kg/cm$^2$ gauge by supplying ethylene, polymerization was conducted for one hour and 55 g of a polymer was obtained. Catalyst efficiency, 74,000 g/g-titanium component.hour. ethylene pressure; MI, 0.19; FR, 88; SR, 0.77.

EXAMPLE 23

Into a pressure-proof ampoule having been purged with nitrogen, were charged 5.0 g of solid material prepared in the same manner as in Example 22 and 50 ml of titanium tetrachloride. After they were subjected to reaction with stirring at 130° C. for two hours, solid part was isolated by filtration, washed thoroughly with hexane and dried, resulting in a pale red-violet supported solid. Four g of this supported solid was charged into a ball mill described in Example 22 and milled singly for 5 hours to obtain a catalyst solid. The analysis of this catalyst solid showed a Ti content of 2.5% by weight. Using this catalyst solid, polymerization was conducted in the same manner as in Example 22. Polymer yield, 49 g; catalyst efficiency, 82,000; MI, 0.25; FR, 75; SR, 0.70.

EXAMPLE 24

The supported solid (3.5 g) synthesized in Example 23 and titanium trichloride (Stauffer Co. AA grade) (0.5 g) were charged into a ball mill described in Example 22, and they were ground together for 5 hours, resulting in a catalyst solid. The analysis of this catalyst solid showed a Ti content of 5.5% by weight. Using this catalyst solid, polymerization was conducted in the same manner as in Example 22. Polymer yield, 94 g; catalyst efficiency, 71,000; MI, 0.20; FR, 90; SR, 0.80.

EXAMPLE 25

Using 3.5 g of base solid synthesized in the same manner as in Example 20 and 0.5 g of titanium trichloride (Stauffer Co. AA grade), a catalyst solid was obtained by grinding them together in the same manner as in Example 22. The analysis of the catalyst solid showed a Ti content of 3.0% by weight. Using this catalyst solid, polymerization was conducted in the same manner as in Example 22. Polymer yield, 43 g; catalyst efficiency, 60,000; MI, 0.18; FR, 82; SR, 0.72.

EXAMPLE 26

Using AlMg$_{6.0}$Et$_{2.0}$n-Bu$_{9.5}$OBu$_{3.5}$ as an organomagnesium compound in an amount of 250 mmol, using HSiCl$_2$(CH$_3$) as a chlorosilane compound and using diisobutylaluminum hydride as an organometallic compound in polymerization, and using all other conditions same as in Example 22, base solid synthesis, catalyst solid synthesis by way of milling together the base solid and titanium trichloride, and polymerization were conducted. The Ti content in the catalyst solid was 3.1% by weight and the results of polymerization were as follows. Polymer yield, 51 g; catalyst efficiency, 69,000; MI, 0.28; FR, 75; SR, 0.72.

EXAMPLE 27

Except for using ZnMg$_{2.0}$Et$_{2.0}$n-Bu$_{3.9}$ as an organomagnesium compound and equimolecular mixture of HSiCl$_3$ and SiCl$_4$ as a chlorosilane compound, a solid material was synthesized in the same manner as in Example 22. Next, using this solid material, supporting reaction was conducted according to Example 23 to synthesize a supported solid. Next, this supported solid and titanium trichloride were milled together in the same manner as in Example 24 to synthesize a catalyst solid. Except for using this catalyst solid and organomagnesium complex AlMg$_{6.0}$Et$_{2.9}$n-Bu$_{12.1}$ as an organometallic compound in the polymerization, polymerization was conducted in the same manner as Example 22. The Ti content in the catalyst solid was 4.8% by weight and the results of polymerization were as follows: Polymer yield, 71 g; catalyst efficiency, 62,000; MI, 0.20; FR, 85; SR, 0.79.

EXAMPLE 28

Using BeMg$_{4.0}$Et$_{0.7}$n-Pr$_{6.3}$[N(n-Bu)$_2$]$_{3.0}$ as an organomagnesium compound, HSiClEt$_2$ as a chlorosilane compound in an amount of 100 mmol, using a base solid-synthesis time of 5 hours (4 hours for dropping and additional one hour after dropwise addition), and other conditions same as in Example 22, a solid material was prepared. This solid material (3.74 g), titanium trichloride (Stauffer Co. HA grade) (0.21 g) and vanadium trichloride (0.05 g) were charged into a ball mill of Example 22 in the same manner, and they were milled togther to prepare a catalyst solid. Except for using this catalyst solid and diethylaluminum ethoxide as an organometallic compound in the polymerization in an amount of 1.6 mmol, polymerization was conducted in the same manner as in Example 22. The Ti content in the solid catalyst was 1.4% by weight and the results of polymerization were as follows: Polymer yield, 20 g; catalyst efficiency, 60,000; MI, 0.31; FR, 74; SR, 0.72.

EXAMPLE 29

Using BMg$_{1.0}$Et$_{2.8}$(n-C$_6$H$_{13}$)$_{1.5}$(SEt)$_{0.7}$ as an organomagnesium compound and employing a solid material synthesis time of 5 hours (four hours for dropwise addition and additional one hour after the dropwise addition) and according to Example 22 except for the conditions mentioned above, a solid material was synthesized. Using this base solid, supporting reaction according to Example 23 was carried out to prepare a supported solid, which was milled singly in a ball mill to synthesize a catalyst solid. Except for using this catalyst solid and tri-n-hexylaluminum as an organometallic compound in the polymerization and in an amount of 3.2 mmol of the latter, polymerization was conducted in the same manner as Example 22. The Ti content in the catalyst solid was 4.5% by weight and the results of polymerization were as follows. Polymer yield, 63 g; catalyst efficiency, 58,000; MI, 0.20; FR, 75; SR, 0.70.

EXAMPLE 30

Except for using

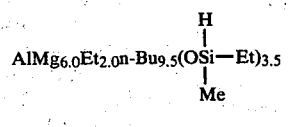

as an organomagnesium compound, a solid material was synthesized in the same manner as in Example 22. This solid material (3.74 g), titanium trichloride (Stauffer Co. AA grade) (0.21 g) and titanium tetrachloride (0.03 ml) were charged into a ball mill described in Example 22 in the same manner and they were milled together to prepare a catalyst solid. Using this catalyst solid, polymerization was conducted in the same manner as in Example 22. The Ti content in the catalyst solid was 1.8% by weight, and the results of polymerization were as follows: Polymer yield, 34 g; catalyst efficiency, 79,000; MI, 0.33; FR, 78; SR, 0.81.

EXAMPLE 31

The catalyst solid synthesized in Example 22 was further treated with ethylaluminum dichloride (condition of treatment: [Ti of catalyst solid]/$AlEtCl_2$ = 1/5, 80° C., one hour), filtered, washed with hexane, dried, and polymerization was carried out in the same manner as Example 22. The Ti content of the treated catalyst solid was 3.0% by weight, and the results of polymerization were as follows: Polymer yield, 50 g; catalyst efficiency, 70,000; MI, 0.15; FR, 88; SR, 0.75.

EXAMPLE 32

The supported solid synthesized as in Example 23 (not yet subjected to single milling) was treated with diethylaluminum chloride (condition of treatment: [Ti of the supported solid]/$AlEt_2Cl$ = 1/5, 80° C., one hour), filtered, washed with hexane, and dried to obtain treated supported solid. This solid was milled singly in a ball mill in the same manner as in Example 23 to prepare a solid catalyst. Using this catalyst solid, polymerization was conducted according to Example 22. The content of Ti in the catalyst solid was 3.0% by weight and the result of polymerization were as follows: Polymer yield, 49 g; catalyst efficiency, 68,000; MI, 0.20; FR, 83; SR, 0.72.

EXAMPLE 33

Polymerization was conducted employing the same catalyst and the same condition as in Example 22 except for using a gaseous mixture of ethylene-butene-1 containing 1% of butene-1 in place of ethylene. The results of polymerization were as follows: Polymer yield, 48 g; catalyst efficiency, 65,000; MI, 0.38; FR, 73; SR, 0.73.

EXAMPLE 34

(i) Synthesis of hydrocarbon soluble organomagnesium complex

Di-n-butyl magnesium (13.80 g) and triethylaluminum (1.90 g) were charged into a 200 ml volume flask having been purged with nitrogen together with heptane (100 ml) and reacted at 80° C. for two hours to obtain a solution of an organomagnesium complex. Analysis showed that the complex has a composition of $AlMg_{6.0}(C_2H_5)_{2.9}(n-C_4H_9)_{12.1}$ and the concentration of the organometal was 1.16 mol/l.

(ii) Preparation of solid material by using reaction agent

Oxygen and moisture in a 200 ml volume flask fitted with a dropping funnel and a water cooled reflux condenser were purged with dry nitrogen, and under nitrogen atmosphere, 50 mmol of trichlorosilane ($HSiCl_3$) solution in heptane (1 mol/l) was charged in the flask and heated to 50° C. Next, the solution of 50 mmol of said organomagnesium complex was measured and taken up into the dropping funnel, added thereto dropwise with stirring over one hour at 50° C., and further reacted therewith at this temperature for one hour. Resulting hydrocarbon insoluble white precipitate was isolated, washed with hexane, and dried to obtain a white solid material. Analysis showed that 1 g of this solid contained 9.20 mmol of Mg, 19.20 mmol of Cl, 1.70 mmol of Si and 0.94 mmol of alkyl group, and specific surface area measured by B.E.T. method was 270 $m^2/g$.

(iii) Preparation of catalyst solid

To a pressure-proof ampoule having been purged with nitrogen were charged 2.0 g of the above mentioned solid material and 30 ml of titanium tetrachloride. After reaction was conducted with stirring at 130° C. for two hours, solid portion was isolated by filtration, washed thoroughly with hexane, and dried, and a pale red-violet treated solid was obtained. Analysis of this treated solid showed that it contains 2.5% by weight of Ti and that the specific surface area measured by B.E.T. method was 210 $m^2/g$.

Hexane (100 ml) was placed in a pressure ampoule having been purged with nitrogen and said solid treated above and ethyl benzoate were fed to give a molar ratio of titanium in the solid to ethyl benzoate of 1:0.2. The mixture was reacted with stirring at 80° C. for one hour. Thereafter, the solid portion was filtered, washed with hexane, and dried to obtain a catalyst solid. The analysis of this solid showed 2.3% by weight of Ti content.

(iv) Slurry polymerization of propylene

The catalyst solid (100 mg) synthesized in (iii), above, and 1.6 mmol of triethylaluminum were charged together with 0.8 liter of hexane into a 1.5-liter autoclave, the inside of which had been purged with nitrogen and deaerated to vacuum. While the temperature inside the autoclave was being maintained at 60° C., hydrogen and propylene were pressurized to 0.1 $kg/cm^2$ and 5.0 $kg/cm^2$, respectively, so that a total gauge pressure of 4.8 $kg/cm^2$ can be achieved. Polymerization was allowed to proceed for one hour by supplying propylene, while maintaining a total gauge pressure of 4.8 $kg/cm^2$. There were obtained 20 g of a hexane-insoluble polymer and 2.4 g of a hexane-soluble polymer.

Catalyst yield was 1,750 g/g of Ti component-hour-propylene pressure. After the hexane-insoluble polymer was extracted with boiling heptane, the remaining portion was 86.5% by weight.

EXAMPLE 35

To 200 ml flask, under nitrogen atmosphere, a 50 mmol solution of the organomagnesium complex synthesized as in Example 34 (i) was charged and its temperature was elevated up to 50° C. Then 50 mmol of trichlorosilane was dropwise added over one hour at this temperature and further reacted at this temperature for one hour. The resultant white precipitate insoluble in hydrocarbon was isolated, washed with hexane and dried. 5.0 g of this solid material and 50 ml of titanium tetrachloride were charted into an autoclave having been purged with nitrogen. After reaction was carried out with stirring at 130° C. for 2 hours, the solid portion was filtered, isolated, fully washed with hexane, dried to obtain a pale red-purple solid supported on a carrier.

Four g of this supported solid and 63 mg (0.06 cc) of ethyl benzoate was charged into a 100 $cm^3$ stainless steel ball mill containing 25 stainles steel balls having 9 mm diameter under nitrogen atmosphere and ground together for 5 hours with a vibration mill operable at 1000 vibration/min. or more to obtain a catalyst solid (S-35).

The analysis of this solid showed a Ti content of 2.3% by weight.

By using 100 mg of the above-obtained catalyst solid (S-35) and 1.6 mmol of triethylaluminum, slurry polymerization of propylene was carried out as in Example 34 to obtain 32 g of hexane-insoluble polymer and 4.2 g of hexane-soluble polymer. Catalyst yield was 2780 g/g-titanium component, hour, propylene, pressure and the remaining portion in the hexane-insoluble polymer after boiling heptane extraction was 84.5%.

EXAMPLE 36

A solid material was synthesized by using the organomagnesium complex compound of Example 34 (ii) as in Example 34 excepting that methyl dichlorosilane (HSiCH$_3$Cl$_2$) was used in place of trichlorosilane.

One point nine g of said solid material was taken in a 200 ml flask equipped with a water-cooled reflux condenser, having been sufficiently purged with nitrogen, and 60 ml of hexane was added thereto. 6 ml of ethyl benzoate (40 mmol) was introduced and reaction was carried out by heating up to a refluxing temperature with stirring for one hour, and the resulting solid portion was isolated, sufficiently washed with hexane and dried. This solid was taken in a pressure-proof ampoule having been purged with nitrogen, and 40 ml of heptane solution of titanium tetrachloride having a concentration of 4.0 mol/l was charged. After reaction at 130° C. with stirring for 2 hours, the solid portion was filtered, fully washed with hexane and dried to obtain pale yellowish white solid catalyst. Result of analysis of this solid catalyst showed that 2.2% by weight of titanium was included therein and the specific surface area was 207 m$^2$/g when measured according to B.E.T. method.

As in Example 34, 100 mg of this catalyst solid and 1.6 mmol of triethylaluminum were used in the slurry polymerization of propylene to obtain 38 g of hexane insoluble polymer and 5.2 g of hexane soluble one. The catalyst yield was 3450 g/g titanium component, hour, propylene pressure and the remaining portion after extraction of hexane-insoluble polymer with boiling heptane was 85.3%.

EXAMPLE 37

The catalyst solid synthesized according to the method of Example 36 was ground by using a grinding mill used in Example 35 to obtain a catalyst solid (S-37).

The result of analysis of this catalyst solid showed 2.2% by weight of Ti content.

By using 100 mg of said catalyst solid (S-37) and 1.6 mmol of triethylaluminum, slurry polymerization of propylene was carried out as in Example 34 to obtain the result of Table 2.

EXAMPLE 38

Three point eight zero g of the solid material of magnesium synthesized as in Example 35 and 0.30 g of titanium trichloride (AA grade of products of Toyo Stauffer Company) were ground together with a vibration type ball mill for 5 hours under nitrogen atmosphere. The resultant solid was reacted with ethyl benzoate as in Example 34 (iii) to obtain a solid catalyst component. The titanium content of resultant catalyst solid was 1.7% by weight. Hundred mg of the catalyst solid and 3.2 mmol of triethylaluminum were used for the polymerization in a hexane solvent as in Example 34 to obtain the result of Table 2.

EXAMPLE 39

Five point zero g of magnesium base solid synthesized as in Example 35 was reacted with titanium tetrachloride as in Example 34 (iii) and then reacted with ethyl benzoate to obtain pale purple solid. Three point nine g of this solid and 0.16 g of titanium trichloride (AA grade of products of Toyo Stauffer Company) were ground together for 5 hours with a vibrating type ball mill under nitrogen atmosphere to obtain a solid catalyst component. The titanium content of the resultant catalyst solid was 3.3% by weight.

By using 100 mg of said catalyst solid and 2.4 mmol of triethylaluminum, slurry polymerization of propylene was carried out as in Example 34 to obtain the result of Table 2.

EXAMPLE 40

By using 3.84 g of the catalyst solid synthesized as in Example 36 and 0.16 g of titanium trichloride were ground with a mill used in Example 35 to obtain a catalyst solid. The result of analysis of this solid showed a titanium content of 3.1% by weight.

By using 100 mg of the said catalyst solid and 1.6 mmols of triethylaluminum, slurry polymerization of propylene was carried out as in Example 34 to obtain the result of Table 2.

EXAMPLE 41

The synthesis of catalyst solid was carried out all as in Example 34 excepting that 100 mmol of hexane solution of titanium tetrachloride (4 mol/l) was used in place of 30 ml of titanium tetrachloride. The result of this catalyst solid showed that Ti-content was 2.0% by weight.

By using 100 mg of this catalyst solid and 1.6 mmol of triethylaluminum, slurry polymerization of propylene was carried out as in Example 34 to obtain the result of Table 2.

EXAMPLE 42

By using 400 mg of the catalyst solid synthesized in Example 34 and 3.2 mmol of triethylaluminu, the polymerization of butene-1 was carried out as in Example 34 to obtain 7.3 g of white polymer.

EXAMPLE 43

By using 400 mg of the catalyst solid synthesized in Example 34 and 3.2 mmol of triethylaluminum, the polymerization of 4-methylpentene-1 was carried out as in Example 34 to obtain 5.6 g of white polymer.

Table 2

| Ex. | Yield of hexane insoluble polymer (g) | Hexane soluble polymer (g) | Catalyst yield g/g-titanium component, hour, propylene pressure | Remaining portion after extraction with boiling heptane |
|---|---|---|---|---|
| 37 | 57 | 8.2 | 5180 | 83.8 |
| 38 | 45 | 3.6 | 5290 | 84.9 |
| 39 | 78 | 11.2 | 4730 | 82.6 |
| 40 | 96 | 12.6 | 6170 | 83.1 |

What is claimed is:

1. In a catalyst useful for polymerizing olefins comprising a solid catalyst component (A) obtained from a magnesium compound plus a titanium or vanadium compound, and an organometallic compound (B) of a metal selected from Groups I, II, III of the Periodic Table, the improvement which comprises forming said solid catalyst component (A) by reacting one mole of an organomagnesium component (i) represented by the general formula $$M_\alpha Mg_\beta R^1_p R^2_q X_r Y_s$$

wherein $\alpha$ is a number of 0 or greater than 0; $\beta > 0$; p, q, r and s are each a number of 0 or greater; $p+q+r+s = m\alpha + 2\beta$ wherein m is the valency of M; M is a metal element of the 1st to the 3rd group of the Periodic Table; $R^1$ and $R^2$ are the same or different hydrocarbon radicals having 1 to 20 carbon atoms; X and Y are the same or different radicals selected from the group consisting of halogen, $OR^3$, $OSiR^4R^5R^6$, $NR^7R^8$ and $SR^9$ wherein $R^3$, $R^4$, $R^5$, $R^6$, $R^7$ and $R^8$ are each hydrogen atom or a hydrocarbon radical having 1 to 20 carbon atoms and $R^9$ is a hydrocarbon radical having 1 to 20 carbon atoms, with 0.01–100 moles of a chlorosilane compound (ii) containing Si-H bond and having the general formula $$H_a SiCl_b R_{4-(a+b)}$$

wherein a and b are each a number greater than 0, having the relationships $a \leq 2$ and $a+b \leq 4$ wherein R is a hydrocarbon radical having 1 to 20 carbon atoms to form a solid (1), and reacting and/or contacting by grinding, said solid (1) with a titanium and/or vanadium halide or alkoxyhalide.

2. A catalyst useful for polymerizing olefins according to claim 1 wherein said organomagnesium component (i) of (A) (1) is a hydrocarbon-soluble organomagnesium complex compound wherein $\alpha$ is a number greater than 0; M is a metal atom selected from the group consisting of aluminum, boron, zinc and beryllium; and X and Y are groups other than halogen, respectively.

3. A catalyst useful for polymerizing olefins according to claim 1 wherein said organomagnesium component (i) is a hydrocarbon-soluble organomagnesium complex compound wherein $\alpha$ is 0 and X and Y are groups other than halogen.

4. A catalyst useful for polymerizing olefins according to claim 2 wherein the ratio of $\beta/\alpha$ is in the range of 0.5–10.

5. A catalyst useful for polymerizing olefins according to claim 2 wherein the ratio of $(r+s)/(\alpha+\beta)$ is in the range of 0–0.8.

6. A catalyst useful for polymerizing olefins according to claim 1 wherein said titanium and/or vanadium compound of (A) (2) is a compound containing 3 or more halogen atoms.

7. A catalyst useful for polymerizing olefins according to claim 1 wherein said titanium and/or vanadium compound is titanium tetrachloride or trichloride.

8. A catalyst useful for polymerizing olefins according to claim 1 wherein said organometallic compound (B) is a hydrocarbon-soluble organomagnesium complex compound represented by the general formula $M_\alpha Mg_\beta R^1_p R^2_q X_r Y_s$ wherein $\alpha$ and $\beta$ are each a number greater than 0, having $\beta/\alpha$ in the range of 0.1–10; p, q, r and s are each 0 or a number greater than 0, having the relationship of $0 \leq (r+s)/(\alpha+\beta) < 1.0$; M is aluminum, zinc, boron or beryllium atom; $R^1$ and $R^2$ are the same or different hydrocarbon radicals having 1–10 carbon atoms; X and Y are the same or different radicals of $OR^3$, $OSiR^4R^5R^6$, $NR^7R^8$ or $SR^9$, wherein $R^3$, $R^4$, $R^5$, $R^6$, $R^7$ and $R^8$ are each hydrogen atom or a hydrocarbon radical having 1–10 carbon atoms and $R^9$ is a hydrocarbon radical having 1–10 carbon atoms.

9. A catalyst useful for polymerizing olefins according to claim 8 wherein said M of the organomagnesium compound (B) is aluminum.

10. A catalyst for polymerizing olefins according to claim 1 wherein said organometallic compound (B) is an organoaluminum compound having the general formula $AlR^{10}_t Z_{3-t}$ wherein $R^{10}$ is a hydrocarbon radical having 1 to 20 carbon atoms; Z is a member selected from the group consisting of hydrogen, halogen, alkoxy, aryloxy, siloxy group; and t is a number of 2–3.

11. A catalyst useful for polymerizing olefins according to claim 10 wherein said organoaluminum compound is trialkylaluminum or dialkylaluminum hydride.

12. A catalyst useful for polymerizing olefins according to claim 1 wherein said reaction of said solid (A) (1) and a titanium and/or vanadium compound (2) is carried out in the presence of liquid phase, at a temperature of 100° C. or higher and a concentration of titanium and/or vanadium compound of 4 mol/l or more.

13. A catalyst useful for polymerizing olefins according to claim 1 wherein said method for contacting by grinding, said solid (A) (1) with a titanium and/or vanadium compound (2) is a method in which mechanical grind-contacting process is used or mechanical grind-contacting process is used in combination with reaction.

14. A catalyst useful for polymerizing olefins according to claim 1 wherein the solid obtained by subjecting (A) (1) and a titanium and/or vanadium compound (2) to reaction and/or contacting by grinding is thereafter heated with an aluminum, tin or silicon halide to effect reaction therewith.

15. In a catalyst useful for polymerizing olefins comprising a solid catalyst compound (A) obtained from a magnesium compound plus a titanium or vanadium compound and an organometallic compound (B) of a metal selected from Groups I, II, III of the Periodic Table, the improvement which comprises forming said solid catalyst component (A) by reacting one mole of an organomagnesium component (i) represented by the general formulas $$M_\alpha Mg_\beta R^1_p R^2_q X_r Y_s$$

wherein $\alpha$ is a number of 0 or greater than 0; $\beta > 0$; p, q, r and s are each a number of 0 or greater, having the relationship of $p+q+r+s = m\alpha + 2\beta$ wherein m is a valency of M; M is a metal element of the 1st to 3rd group of the periodical Table; $R^1$ and $R^2$ are the same or different hydrocarbon radicals having 1 to 20 carbon atoms; X and Y are the same or different radicals selected from the group consisting of halogen, $OR^3$, $OSiR^4R^5R^6$, $NR^7R^8$ and $SR^9$ wherein $R^3$, $R^4$, $R^5$, $R^6$, $R^7$ and $R^8$ are each hydrogen atom or a hydrocarbon radical having 1 to 20 carbon atoms and $R^9$ is a hydrocarbon radical having 1 to 20 carbon atoms, with 0.01 to 100 moles of a chlorosilane compound (ii) containing Si—H bond and having the general formula $$H_aSiCl_bR_{4-(a+b)}$$

wherein a and b are each a number greater than 0; a≦2 and a+b≦4; and R is a hydrocarbon radical having 1 to 20 carbon atoms, to form a solid (1), and subjecting said solid (1) together with a titanium halide or alkoxyhalide (2) and an electron donor compound (3) to reaction and/or grinding.

16. A catalyst useful for polymerizing olefins according to claim 15 wherein said electron-donor compound (3) is a carboxylic acid or a derivative thereof selected from a carboxylic acid having up to 30 carbon atoms, an acid halide having up to 30 carbon atoms, an acid anhydride and a carboxylic acid ester having up to 30 carbon atoms in the acid moiety.